United States Patent [19]

Dames

[11] Patent Number: 4,761,012
[45] Date of Patent: Aug. 2, 1988

[54] DEVICE TO TRANSPORT SUITCASES

[76] Inventor: Peter K. Dames, 66 Bond Street, Cambridge, Ontario, Canada, N1R 4B6

[21] Appl. No.: 9,968

[22] Filed: Feb. 2, 1987

[51] Int. Cl.⁴ .............................................. B62B 1/20
[52] U.S. Cl. .................... 280/38; 190/18 A; 280/37; 280/646; 280/652; 280/655
[58] Field of Search .................. 280/37, 38, 641, 646, 280/652, 655, 47.26; 190/18 A

[56] References Cited

U.S. PATENT DOCUMENTS

| | | | |
|---|---|---|---|
| 2,002,836 | 5/1935 | Rossi | 280/645 |
| 2,539,993 | 1/1951 | Davis | 280/645 |
| 2,602,675 | 7/1952 | Forman | 280/655 |
| 2,760,782 | 8/1956 | Hartzell | 280/655 |
| 3,842,953 | 10/1974 | Royet | 190/18 A |
| 3,865,392 | 2/1975 | Hartway | 280/35 |
| 3,960,252 | 6/1976 | Cassimally | 280/37 |
| 4,314,624 | 2/1982 | Royet | 280/646 |
| 4,335,895 | 6/1982 | Walker | 280/652 |
| 4,506,897 | 3/1985 | Libit | 280/655 |
| 4,588,055 | 5/1986 | Chen | 280/43.17 |
| 4,591,183 | 5/1986 | Gordon et al. | 280/655 |
| 4,614,349 | 9/1986 | Wenzel | 280/43.1 |

FOREIGN PATENT DOCUMENTS 2306653 11/1976 France .............................. 280/652

*Primary Examiner*—John J. Love
*Assistant Examiner*—Eric D. Culbreth
*Attorney, Agent, or Firm*—Patrick J. Hofbauer

[57] ABSTRACT

A portable baggage carrier having the form of a shallow enclosed housing has straps for securing the carrier to one side of a suitcase. A side panel of the housing opens to provide access to a pair of wheels pivotably mounted to lie flat within the carrier, which extend downwardly below the carrier and articulate through 90 degrees upon being deployed to an operative position. A collapsible handle also is stored within the housing, being accessible through the side panel for attachment to the top of the carrier. Closure of the side panel with the wheels deployed serves to lock the wheels in their extended position.

9 Claims, 5 Drawing Sheets

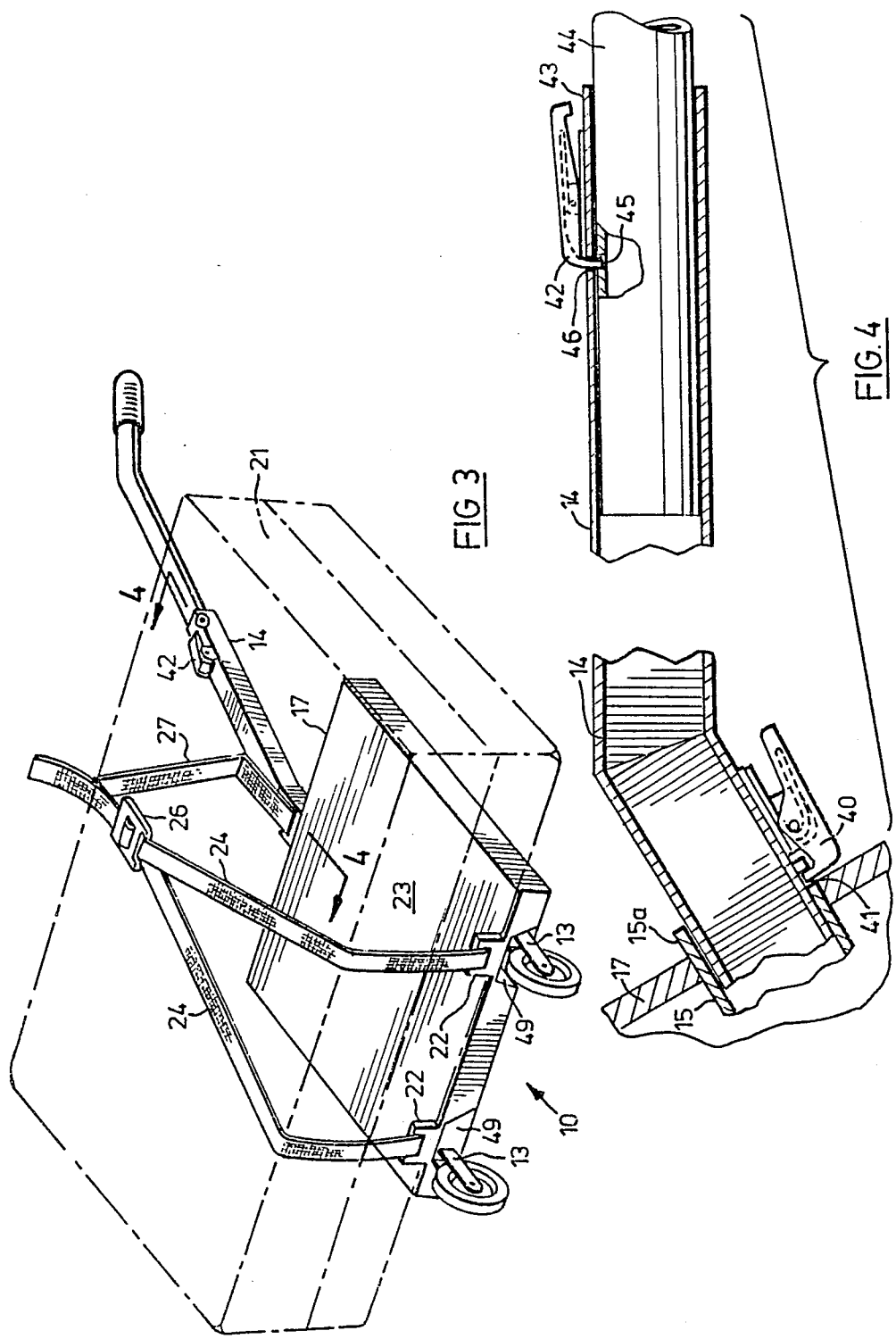

DEVICE TO TRANSPORT SUITCASES

BACKGROUND OF THE INVENTION

This invention is directed to a wheeled carrier device and in particular to a baggage carrier device having wheels retractable within the device.

The public is well acquainted with a large number of wheeled devices, generally of a collapsible nature, for use by the travelling public in handling their baggage. Many of these collapsible devices of the prior art are adapted for removable attachment to one side or to the bottom of the luggage, so as to travel in the baggage hold of an aircraft as a part of the luggage while being readily extensible when required by the owner, to facilitate handling of the luggage. Other, generally older types are incorporated into the actual construction of the luggage.

Certain examples of the prior art, of the types referred to above, are to be found in the following United States patents;

U.S. Pat. No. 2,002,836 Rossi, May 28th, 1935
U.S. Pat. No. 2,539,993 Davis, Jan. 30th, 1951
U.S. Pat. No. 2,602,675 Forman July 8th, 1952
U.S. Pat. No. 3,842,953 Royet, Oct. 22, 1974
U.S. Pat. No. 3,865,392 Hartway, Feb. 11th, 1975
U.S. Pat. No. 3,960,252 Cassimally, June 1st, 1976
U.S. Pat. No. 4,314,624 Royet, Feb. 9th, 1982
U.S. Pat. No. 4,335,895 Walker, June 22nd, 1982
U.S. Pat. No. 4,506,897, Libit, Mar. 26th, 1985
U.S. Pat. No. 4,588,055 Chen, May 13th, 1986.

In the case of the built-in arrangements, these are not generally suitable for use with present day types of luggage, especially soft-sided luggage, as they require large rigid support structures.

The strap-on type of device in the prior art are typified by their heaviness and complexity of design and the presence of a miscellany of projecting components which can cause snagging, hang-ups and even injury to the baggage handlers and their equipment.

SUMMARY OF THE INVENTION

The present invention provides a lightweight hand portable baggage handling device incorporating an enveloping housing within which the requisite functional components of the device may be readily and rapidly concealed. The improved device has, in its retracted configuration, the general appearance of a thin briefcase and can be secured by a strap to the side of a suitcase without adding unduly to the weight or bulk of the luggage item, and in such configuration presents no substantial projecting members to cause hang ups or damage. The device may thus be left strapped to the luggage during transport, without significant loss of luggage space, or weight penalty. A small pair of projecting tabs positioned along a lower edge provide the attachment points for the securing straps, on which tabs the suitcase lower edge can rest. In this manner the securing straps also act as a safety device to prevent accidental opening of the luggage in transit.

When required for use, a pair of wheels are deployed from their stored, flattened condition within the housing, to an extended position beneath the housing, being articulated into spaced, mutually parallel relation. A collapsible telescopic handle is withdrawn from inside the housing and secured exteriorly thereof, to facilitate handling of the luggage. The handle length may be optionally adjusted for ease of use by persons of different size, without the need for changes to the remainder of the device. Moreover, the unique design allows the entire load being carried to sit generally perpendicular over the wheels, thus substantially eliminating strain on the operator.

In the preferred embodiment, the operable back cover of the housing serves, in the closed position, to lock the deployed wheels in their operative position.

The present invention thus provides a hand transportable baggage carrier having a main wall and a plurality of shallow peripheral side wall portions extending generally transversely therefrom to define a housing. At least one wheel is rotatably mounted on an axle with a stem portion adapted adjacent one end for supporting the axle and having a substantially planar bent portion adjacent its opposite other end, said bent portion lying in a plane inclined at substantially 45 degrees to the axis of the axle. A pivot means is located within the housing, and has a pivotal axis inclined at an angle of substantially 45 degrees from the main wall, the bent portion being secured to the pivot means in pivotal relation therewith for pivoting displacement of the stem portion and said axle whereby in a first, retracted position, the wheel is positioned substantially within the housing in substantially parallel relation with the main wall, and when deployed for use, is positioned in a second, extended position substantially outside the housing in operative underlying relation thereto, with the wheel at substantially a right angle to the main wall, the device having locking means for selectively securing the wheel in its second, deployed position.

The present invention, by use of a simple inclined pivot located within the housing and a correspondingly bent portion of the stem portion from which the respective wheel is supported, achieves articulation of the wheel through 90 degrees, while the stem portion is displaced through 180 degrees, from a first, retracted position to a second, deployed position.

BRIEF DESCRIPTION OF THE DRAWINGS

These and other novel features of the present invention will be more readily understood after reading the following description of a preferred embodiment thereof, described by way of example only, with reference being made to the accompanying drawings, wherein;

FIG. 3 is a perspective view similar to FIG. 1, with the baggage carrier in reversed orientation in the deployed condition, the suitcase being shown in phantom;

FIG. 4 is a section along line 4—4 of FIG. 3;

DETAILED DESCRIPTION OF THE PREFERRED EMBODIMENT

Figure 1:
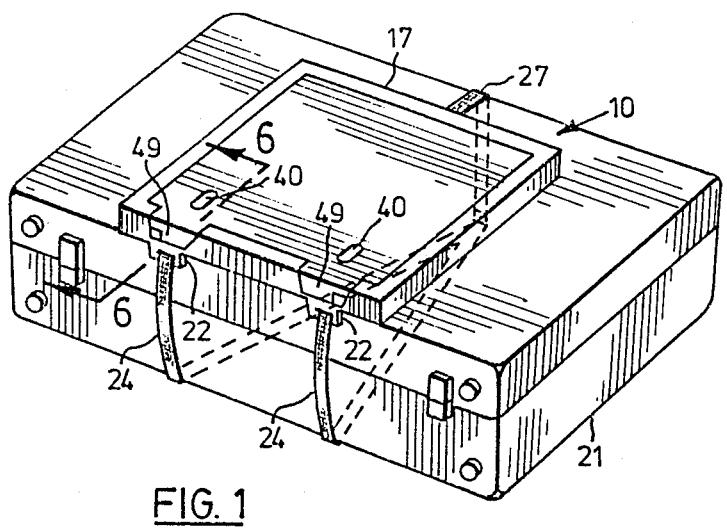
FIG. 1 is a perspective view showing a preferred form of baggage carrier according to the invention in the retracted condition and secured to a suitcase.

FIG. 1 shows the baggage carrier 10, in its retracted condition, secured in strapped relation to a suitcase 21, so as to form a composite unit, suitable for consignment to airlines baggage handlers, or for stowage in a car trunk.

Figure 2:
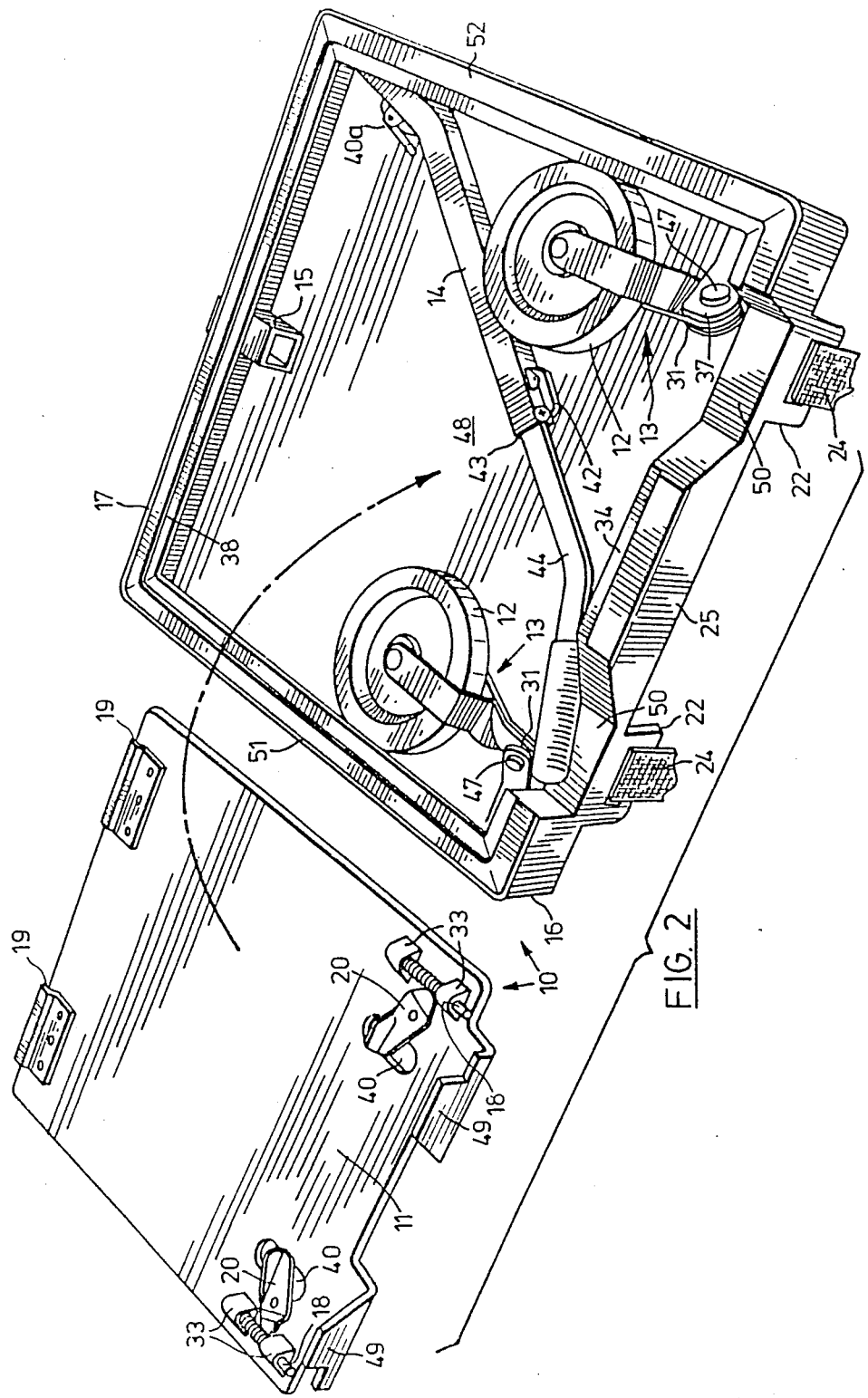
FIG. 2 is a perspective view of the baggage carrier of FIG. 1, without the suitcase, and having the rear cover removed.

As shown in FIG. 2, the hand transportable baggage carrier 10 of the present invention has a removeable back cover 11 which is rigid, and which conceals, within a housing 16, a pair of wheels 12, 12 supportingly mounted for rotation upon a fork member 13. The wheels 12, 12 are perferably of relatively large diameter, for example, 6", so as to allow the operator to run the carrier 10 up and down curbs with relative ease.

The housing 16 is defined by a main wall 53, having an exterior front face 23 and an interior rear face 48, and by top 17, side 51 and 52, and bottom 25 peripheral walls. In the preferred embodiment illustrated, these elements are integrally moulded of fibreglass or plastic material to form a rigid, lightweight unitary structure, but such integration is not essential to the invention, so long as the peripheral walls 17, 25, 51 and 52 are connected to one another to form a rigid housing frame.

The housing 16 is adapted to contain, in the retracted configuration of the carrier 10, a collapsed telescopic handle 14. The handle 14 has a square section for insertion into a similarly profiled tubular coupling 15 which coupling is centrally positioned along the top peripheral wall 17 of carrier 10, so as to open into the housing 16.

Figure 6:
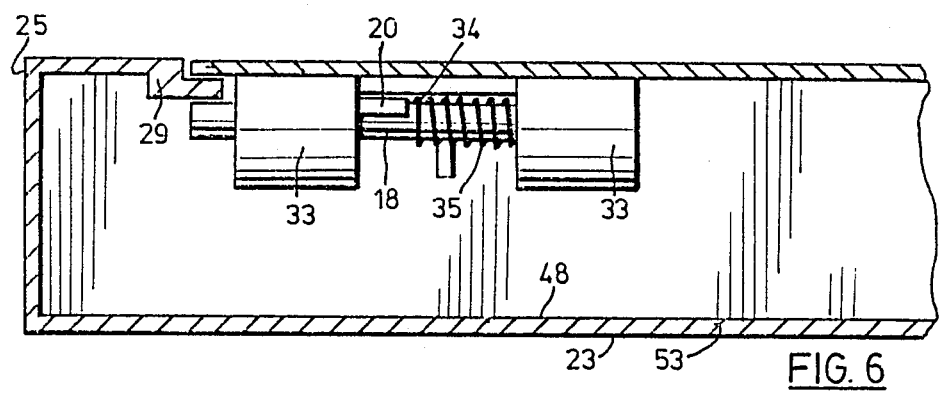
FIG. 6 is a section along line 6—6 of FIG. 1, and appears on the same sheet as FIG. 1.

The removeable back cover 11 has a pair of cranked clips 19 for insertion beneath an inturned flange portion 38 of the top peripheral wall 17, and an opposed pair of release handles 20, 20 are pivotally mounted on the inside of the back cover 11. As best seen in FIGS. 2 and 6, the handles 20 each slidingly engage, by means of notch 34, a latch pin 18, which pin is mounted for longitudinal sliding movement in bored mounting blocks 33, 33. A spring 35 surrounds the pin 18 so as to bias it and the notchingly engaged release handle 20 to the closed position, whereat the free end 36 of the pin 18 engages an inturned flange portion 29 of a bottom peripheral wall 25 of the housing 16. Operative access to the release handles 20, 20 is by means of a corresponding pair of finger holes 40, 40. Any other suitable latching means can be readily adopted for holding the bottom edge of the back cover 11 in place on the housing 16.

A pair of lips 22 project outwardly and forwardly from the bottom peripheral wall 25 of the housing 16, upon which lips can rest a piece of luggage 21, the luggage being secured in place against the front face 23 of the main wall 53 by means of a V-strap 24 secured at its mid-point to a top strap 27 by means of an adjustable buckle 26. The two free ends of the V-strap 24 are permanently affixed one each to the lips 22, 22. The straight strap 27 is permanently affixed to the top peripheral wall 17 of the housing 16. The buckle 26 allows snug fitting adjustment of the straps 24 and 27 around the suitcase 21.

As best seen in FIG. 4, the telescopic handle 14 has a bottom pivotal catch member 40a which is spring biased for securement of the handle 14 to the tubular coupling 15, whose upper edge 15a protrudes slightly above the top wall 17 of the housing 16 to present a slot 41 for engagement by the catch member 40a. A second spring biased catch member 42, similar in construction to lower catch member 40a, is mounted adjacent to the top edge 43 of the handle 14, so as to engage, through slot 46, a slot 45 in the telescopically slidable inner tubular portion 44 of the handle 14, when the handle 14 is fully extended, thereby to hold the handle 14 in the fully extended configuration.

Figure 7:
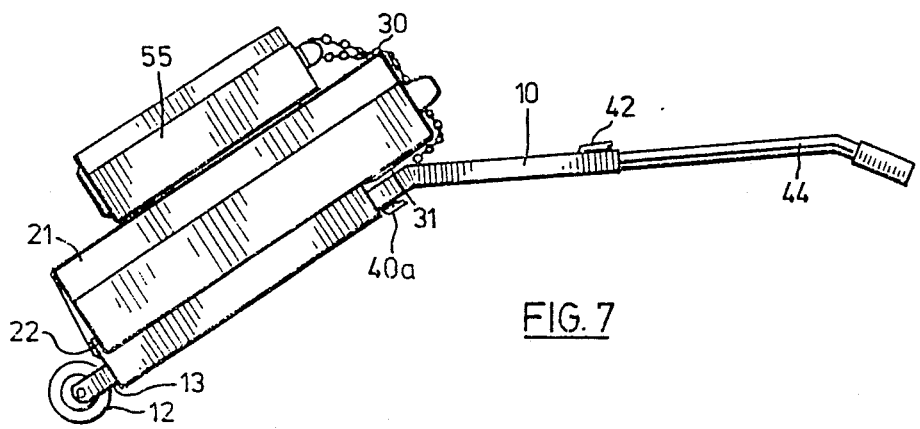
FIG. 7 is a side elevational view showing the carrier in use, having a second suit case attached piggy-back to a first suitcase mounted on the baggage carrier, and appears on the same sheet as FIG. 1.
Figure 8:
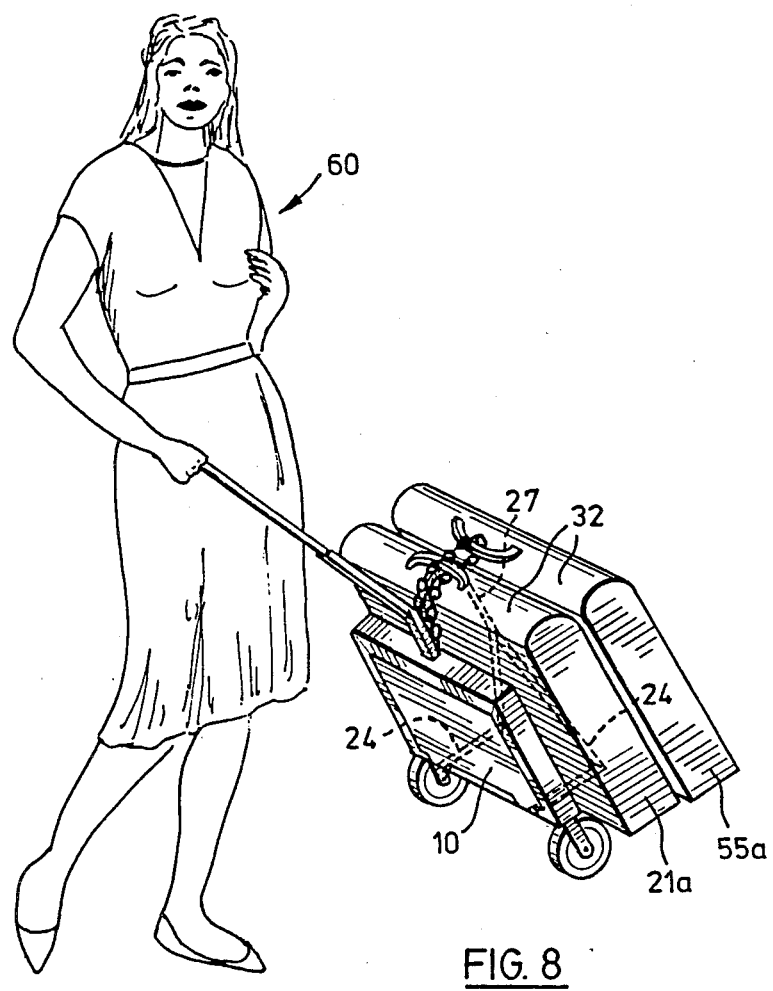
FIG. 8 is a perspective view similar to FIG. 7, showing a user pushing the carrier loaded with two suitcases.

A chain 30, having a terminal snap-clip (not shown), is secured to the top edge 17 of the carrier 10 so as to permit the securing of a second suitcase 55 in piggyback relation to the case 21, by insertion of the chain 30 around the handle of the second case (see FIG. 7), whereafter it is clipped back upon itself by way of the snap-clip. A small padlock (not shown) may also be used to lock the chain 30 upon itself thus preventing theft of the carrier from the luggage. As seen in FIG. 8, where the two suitcases 21a and 55a are properly positioned, the top surfaces 32 of the suitcases 21a and 55 may be used as a platform for a third piece of smaller luggage, garment bags etc. (not shown).

Each fork member 13 has an end stem portion 31 skewed at 45 degrees from the plane of the wheel 12. Each stem portion is pivotably secured by a pivot bolt 47 to a bracket 37 rigidly mounted within the housing. The internal side surfaces 61 of brackets 37 are inwardly inclined at an angle of substantially 45 degrees to the inner surface 48 of the front face 23 of the main wall 53. The pivot bolt 47 extends substantially normal to said side surfaces 61 of each bracket 37, connecting the end stem portion 31 of the fork-stem 13 to the bracket, for pivotal movement about the bolt 47.

Figure 5:
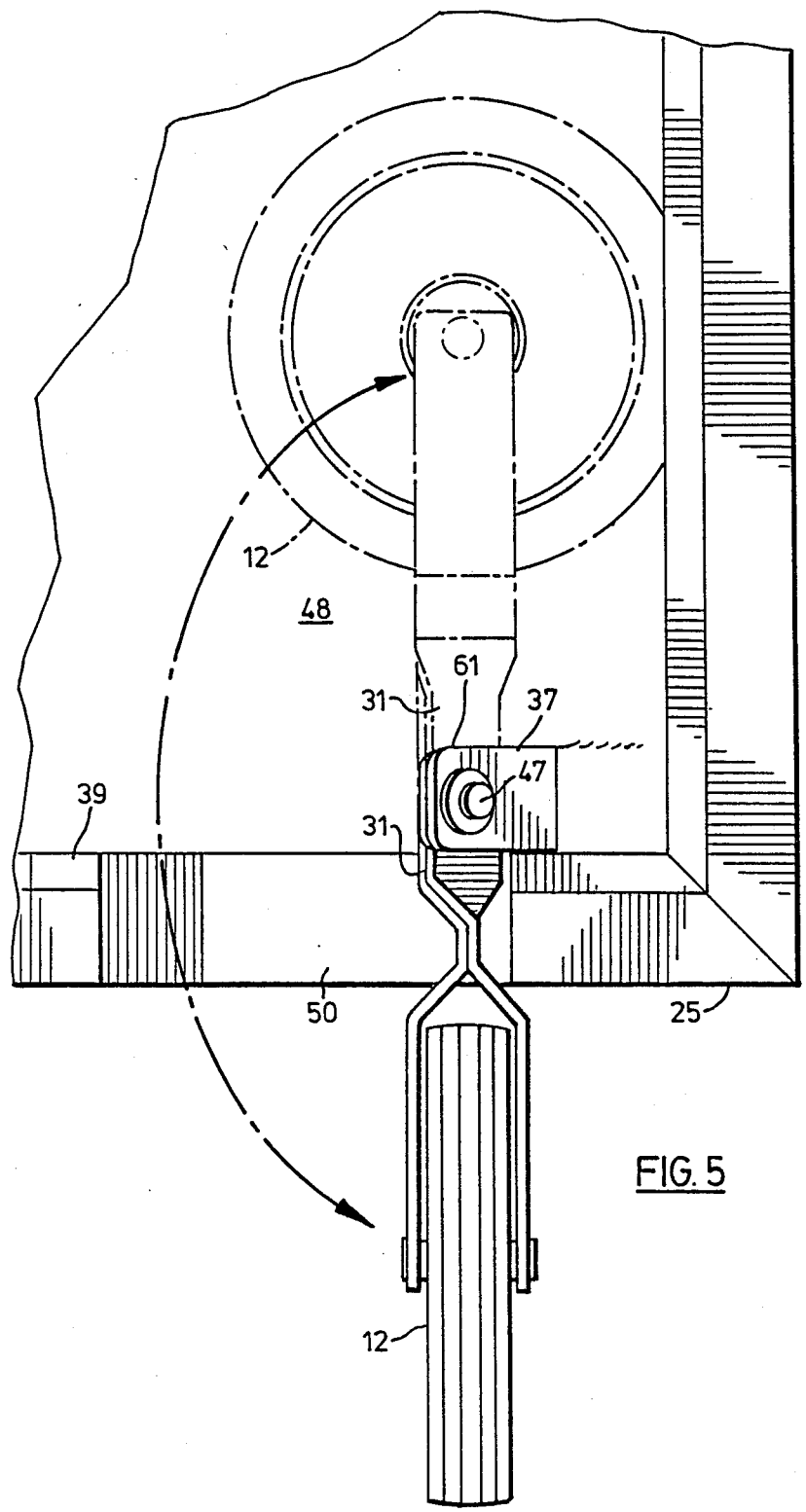
FIG. 5 is a partial view showing a wheel in the deployed (solid outline) and folded (phantom outline) positions.

In the position of retraction illustrated in FIG. 2 and in phantom outline in FIG. 5, the wheels 12 are positioned generally parallel to the inner surface 48 of the main wall 53. As the wheels 12 are pivottoed downwardly and outwardly from the interior of the housing 16, the cooperating inclined side surfaces 61 and the skewed complementary angle of end stem portion 31 causes an articulating reorientation of the wheels 12. When the fully extended portion is reached (as shown in solid lines in FIG. 5), the place of the wheels 12 is inclined at substantially right angles to the plane of the front 23 and inner 48 of the main wall 53 in fully operational relation therewith, as also shown in FIGS. 3 and 7.

Referring to FIGS. 2 and 3, edge portions 49 of the back cover 11 extend, when the cover is in the closed and latched position, into corresponding recesses 50 defined by the lower peripheral wall 25 of the housing, so as to abut against the stem portions 31, 31 thereby to preclude their rearward pivotting about pivot bolts 47. Thus, the wheels 12 are secured substantially immoveable in their operative position by the rear cover 11.

In use, the baggage carrier 10 is secured, in its retracted condition, to a piece or pieces of luggage, in which condition the luggage is suited for manual handling, automated baggage handling, stowage in a car trunk or aircraft, etc.

The carrier 10 is readily deployed by removing the back 11, pivotting the wheels 12 from their retracted positions to their deployed positions, withdrawing, extending and inserting the handle 14 into the coupling 15, and replacing the back cover 11 in locking relation with the wheels 12. In this condition the carrier 10 provides a lightweight, robust and easily manoeuvrable baggage transportation system. As shown in FIG. 8, the baggage carrier 10 is preferably manoeuvred by an operator 60 pushing the carrier 10 from behind, although it is obvious that the carrier may instead be pulled by the operator. The inventor's experience suggests that the pushing mode of operation illustrated provides better manoeuvrability.

While the preferred embodiment described herein incorporates a one-piece rigid housing having a built-in integral main wall (such as can be simply and inexpensively made by modern injection moulding techniques) a soft-sided main wall, as in the manner of a soft-sided suitcase, can instead be utilized. In such instance, the inclined brackets about which the wheels pivot may be attached to, and extend from, the peripheral wall portions into the interior of the housing.

Similarly, the operable cover can be hinged from either side, or the top, so as to provide the desired access, and, preferably, to provide the locking function for the wheels when deployed.

Moreover, a soft-sided rear cover can be employed, in which instance the wheels are preferably secured in their deployed position by latching means comprising one or more latch members mounted on the peripheral walls, which walls together form a housing frame.

Alternatively, the pivot bolts about which the wheels pivot when deployed, can have a pair of flats on the sides thereof, with the aperture in the wheel stem correspondingly slotted, so as to lock the wheel suspension against rotation when the stem is slid upwardly to engage the flats on the pivot bolt. (i.e. the stem apertures within which the pivot bolt extends are keyhole shaped, so as to lock the wheels against retraction when load is applied to the device.)

Other modifications and design changes will be obvious to those skilled in the art from the aforementioned exemplary description and such non-inventive changes are to be included within the scope of this invention where they fairly fall within the spirit and scope of the invention as set out in the following claims.

What I claim is:

1. A hand transportable baggage carrier comprising:
   (a) a main wall;
   (b) a plurality of rigid, shallow peripheral wall portions extending generally transversely from said main wall, the main wall and the peripheral wall portions together defining a housing;
   (c) at least one wheel rotatably mounted on an axle;
   (d) a stem portion supporting said axle adjacent one end and having a substantially planar bent portion adjacent its opposite other end, said bent portion lying in a plane inclined a substantially 45 degrees to the axis of said axle;
   (e) luggage attachment means affixed to the housing for securement of at least one suitcase in secured relation to said main wall;
   (f) pivot means rigidly positioned within said housing and having a pivotal axis inclined at an angle of substantially 45 degrees from said main wall;
   (g) said bent portion being secured to said pivot means in pivotal relation therewith for pivoting displacement of said stem portion and said axle;
   (h) whereby in a first retracted position said wheel is positioned within said housing in substantially parallel relation with said main wall, and in use, in a second deployed position at which the stem portion has been pivotally displaced through 180 degrees, the wheel has rotated through only 90 degrees so as to be positioned substantially outside of the housing, in operative underlying relation thereto, and substantially at right angles to said main wall; and,
   (i) locking means for securing said at least one wheel in said second position.

2. A baggage carrier as set forth in claim 1, having a pair of said wheels pivotted within said housing, and handle means adapted for releasable attachment to said housing so as to extend oppositely of said wheels, thereby to facilitate the movement of the carrier when the wheels are secured in said second position.

3. A baggage carrier as set forth in claim 2, including cover means removeably secured to said housing in concealing relation with said wheels when in said first position.

4. A baggage carrier as set forth in claim 3, said cover means incorporating said locking means therewith, to secure said wheels in said second position.

5. A baggage carrier as set forth in claim 4, wherein said main wall is rigid, and said pivot means is rigidly positioned thereon.

6. A baggage carrier as set forth in claim 5, said handle means being stowable within said housing.

7. A baggage carrier as set forth in claim 5 wherein said handle means is telescopic.

8. A baggage carrier as set forth in claim 7 wherein the luggage attachment means comprises a V-strap affixed by its two free ends to a bottom one of said peripheral walls of the housing and a straight strap affixed to a top one of said peripheral walls of the housing, the two straps being adjustably connectable to one another by a buckle means so as to be adapted for securement of said at least one suitcase to said main wall.

9. A baggage carrier according to claim 8 wherein each of said stem portions extends through a recess in said bottom one of said peripheral walls.

* * * * *